(12) United States Patent
Stewart et al.

(10) Patent No.: US 9,970,471 B2
(45) Date of Patent: *May 15, 2018

(54) DIRECT TENSION INDICATOR PLATE AND ASSEMBLY

(71) Applicants: Robert E. Stewart, Farmington Hills, MI (US); Nicholas Strumbos, Birmingham, MI (US)

(72) Inventors: Robert E. Stewart, Farmington Hills, MI (US); Charles Lee Dardas, Rochester, MI (US)

(73) Assignees: Robert E. Stewart, Farmington Hills, MI (US); Nicholas Strumbos, Birmingham, MI (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/949,930

(22) Filed: Nov. 24, 2015

(65) Prior Publication Data
US 2016/0076573 A1 Mar. 17, 2016

Related U.S. Application Data

(63) Continuation of application No. 14/217,899, filed on Mar. 18, 2014, now Pat. No. 9,239,071.

(51) Int. Cl.
*F16B 31/02* (2006.01)

(52) U.S. Cl.
CPC ............ *F16B 31/028* (2013.01); *F16B 31/02* (2013.01)

(58) Field of Classification Search
CPC ...... F16B 31/02; F16B 31/024; F16B 31/028; G01L 5/24; G01L 5/243

USPC ................................................ 411/8–11, 14.5
See application file for complete search history.

(56) References Cited

U.S. PATENT DOCUMENTS

| | | | | |
|---|---|---|---|---|
| 3,104,645 | A * | 9/1963 | Harrison .................. | E21D 21/02 116/212 |
| 3,187,621 | A * | 6/1965 | Turner ................... | F16B 31/028 411/10 |
| 3,304,827 | A * | 2/1967 | Bush ....................... | F16B 39/24 411/13 |
| 3,474,701 | A * | 10/1969 | Setzler .................. | F16B 31/028 411/8 |
| 3,948,141 | A * | 4/1976 | Shinjo .................... | F16B 31/028 116/DIG. 34 |

(Continued)

*Primary Examiner* — Roberta S Delisle
(74) *Attorney, Agent, or Firm* — Reising Ethington, P.C.

(57) ABSTRACT

A direct tension indicator plate, washer assembly, and fastener assembly. The plate includes an annular array of circumferentially-spaced legs extending radially outwardly from a hub, wherein each leg includes a foot portion oriented at least partially in a circumferential direction. The washer assembly includes an indicator plate carried by a washer plate having an annular array of protuberances projecting from a surface, a portion of the indicator plate being carried on the protuberances. The fastener assembly includes a fastener having an axially facing surface positioned against an annular portion of an indicator plate to sandwich the annular portion between the axially facing surface and an array of protuberances of a washer plate, wherein, when the fastener is fastened against the washer plate placing the indicator plate in compression with the washer plate, the array of legs are displaced radially outwardly.

20 Claims, 5 Drawing Sheets

(56) References Cited

U.S. PATENT DOCUMENTS

| | | | | |
|---|---|---|---|---|
| 4,020,734 A * | 5/1977 | Bell | F16B 31/028 | 411/10 |
| 5,015,132 A * | 5/1991 | Turner | F16B 31/028 | 411/10 |
| 5,370,483 A * | 12/1994 | Hood | F16B 31/028 | 116/DIG. 34 |
| 5,667,346 A * | 9/1997 | Sharp | F16B 31/028 | 411/10 |
| 5,931,618 A * | 8/1999 | Wallace | G01L 5/243 | 116/212 |
| 6,135,687 A * | 10/2000 | Leek | F16B 31/028 | 411/10 |
| 6,152,665 A * | 11/2000 | Wallace | F16B 31/028 | 116/212 |
| 6,425,718 B1 * | 7/2002 | Herr | F16B 31/028 | 411/10 |
| 6,729,819 B2 * | 5/2004 | Wallace | F16B 31/028 | 411/11 |
| 7,021,153 B2 * | 4/2006 | Almanstoetter | F16B 1/0071 | 73/761 |
| 7,857,562 B2 * | 12/2010 | Wallace | F16B 31/028 | 411/10 |
| 7,927,049 B2 * | 4/2011 | Adams | F16B 37/14 | 411/102 |
| 8,337,129 B2 * | 12/2012 | Boyce | F16B 31/028 | 411/102 |
| 2008/0138167 A1 * | 6/2008 | Wallace | F16B 31/028 | 411/14 |
| 2015/0204368 A1 * | 7/2015 | Stewart | F16B 31/028 | 411/10 |

\* cited by examiner

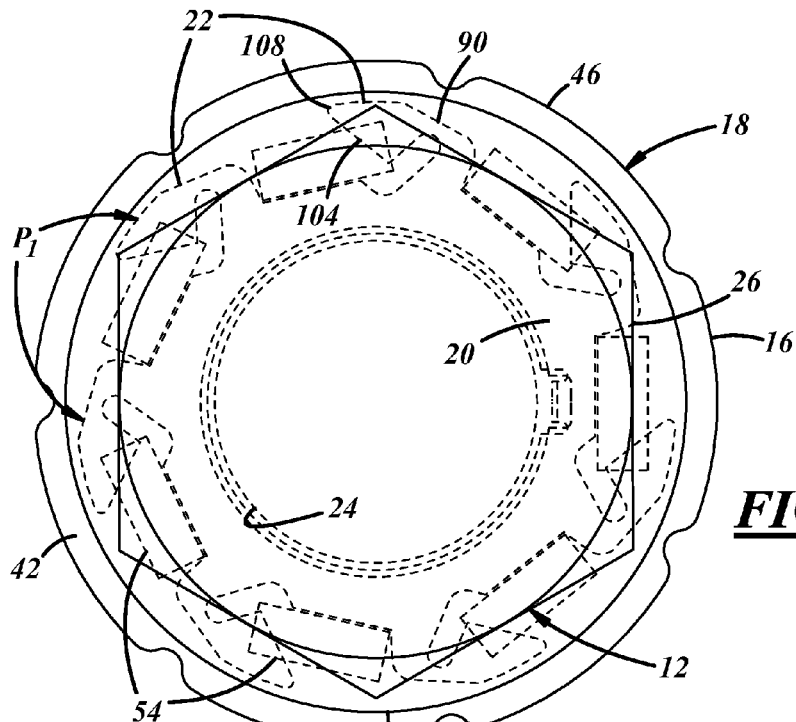
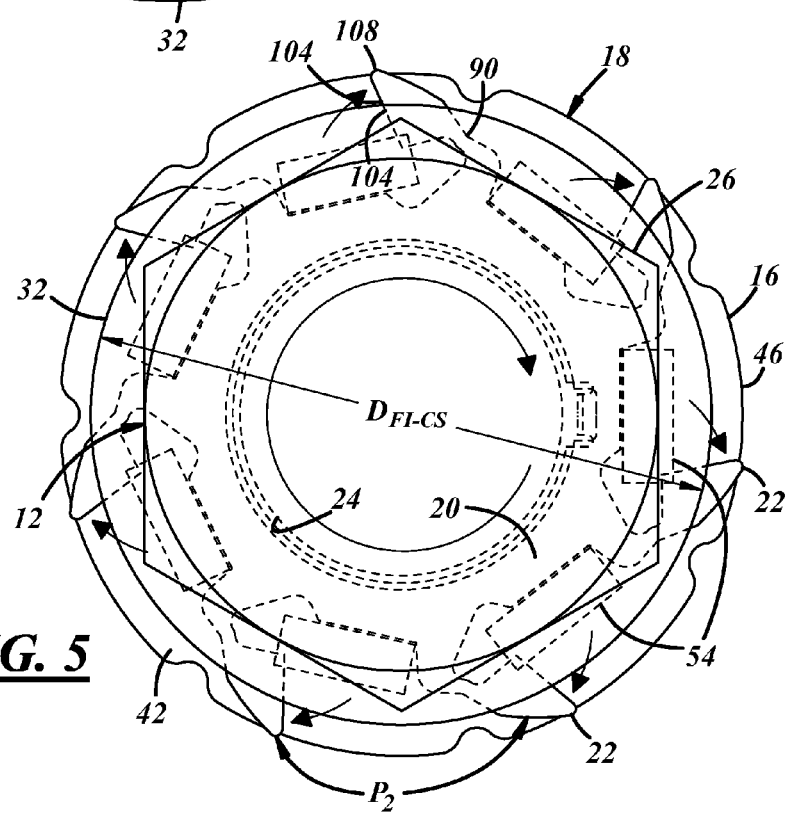

DIRECT TENSION INDICATOR PLATE AND ASSEMBLY

The present disclosure is directed to a tension indicator for use with a washer and a fastener.

BACKGROUND AND SUMMARY OF THE DISCLOSURE

Various governmental and private organizations develop and publish industrial and military standards for a number of reasons including interoperability, safety, repeatability, quality, etc. One such standard is ASTM-F959 which discloses a standard specification for compressible washer type direct tension indicators for use with structural fasteners. Among other things, the standard discloses requirements for tension indicators capable of indicating the achievement of a specified minimum bolt tension in a structural bolt, as one example.

A general object of the present disclosure, in accordance with one aspect of the disclosure, is to provide a direct tension indicator (DTI) plate for use with a washer plate.

The present disclosure embodies a number of aspects that can be implemented separately from or in combination with each other.

In accordance with one aspect of the disclosure, there is provided a direct tension indicator (DTI) plate. The DTI plate may include a hub having an opening, and an annular array of circumferentially-spaced legs extending radially outwardly from the hub. Each leg may include a knee portion extending from the hub, a foot portion, and an ankle portion joining the knee and foot portions, and the foot portions may be oriented at least partially in a common, circumferential direction. In addition, the ankle portion may be narrower than the knee portion.

In accordance with another aspect of the disclosure, there is provided a direct tension indicator (DTI) washer assembly that includes a washer plate and an indicator plate. The washer plate may have an annular array of protuberances projecting from a first surface. Each protuberance may have a compression surface axially spaced from the first surface. Further each protuberance may be defined by a first circumferential end and a second circumferential end, and both first and second circumferential ends may extend radially outwardly. The indicator plate may be carried by the washer plate and include a hub and an annular array of legs extending radially outwardly from the hub. Each leg may have a first portion coupled to the hub and have a second portion extending therefrom. The first portion of the leg may extend between the first circumferential end of one protuberance and the second circumferential end of a circumferentially adjacent protuberance and bear against the first circumferential end. Further, the second portion of each leg at least partially may overlay the compression surface of the circumferentially adjacent protuberance.

In accordance with another aspect of the disclosure, there is provided a direct tension fastener assembly that includes a washer plate that includes both an opening and an annular array of protuberances projecting from a first surface, an indicator plate, and a fastener. The indicator plate may be carried fixedly by the first surface of the washer plate and may include both a hub having an opening and an annular array of legs correspondingly circumferentially spaced apart with respect to the array of protuberances. Each leg may have a flex region and a foot extending from the flex region circumferentially-oriented in a first position. The fastener may have an axially facing surface positioned against the protuberances. When the fastener is fastened against the washer plate placing the indicator plate in compression with the washer plate, the feet may be configured to move to a second position radially outwardly of the first position, pivoting at the flex region.

BRIEF DESCRIPTION OF THE DRAWINGS

The disclosure, together with additional objects, features, advantages and aspects thereof, will best be understood from the following description, the appended claims and the accompanying drawings, in which:

FIG. 4 is a top view of a fastener and the DTI washer assembly illustrating multiple legs of a direct tension indicator DTI plate in a first position;

FIG. 5 is a top view of the fastener and the DTI washer assembly illustrating multiple legs of the DTI plate in a second position;

DETAILED DESCRIPTION OF PREFERRED EMBODIMENTS

Figure 1:
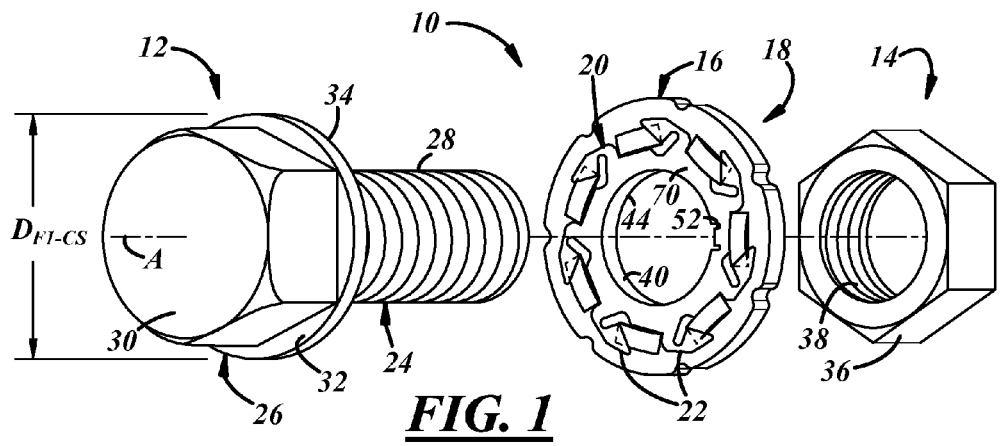
FIG. 1 is an exploded, perspective view of a direct tension indicating (DTI) washer assembly and two fasteners.

The drawings illustrate a device that is particularly adapted for providing an indication of a desired applied force in a direct tension fastener assembly 10. In the specific example illustrated in FIG. 1, the fastener assembly 10 includes a first fastener 12, a second fastener 14, a washer plate 16, and a direct tension indicator (DTI) plate 20 along a longitudinal axis A. The washer plate 16 and the indicator plate 20 are shown coupled together as a direct tension indicator (DTI) washer assembly 18. The indicator plate 20 is configured with legs 22 that extend circumferentially, but fan radially outwardly when the desired torque is applied (for example, as illustrated in FIG. 5). Thus for example, the repositioned legs 22 may give an indication to a mechanic to stop applying torque to the fasteners 12, 14. The indication may be visible and/or tactile. The tactile indication may be particular useful in harsh environments, e.g., where the fastener assembly 10 is covered in mud. For example, when the desired torque is applied to the mud-covered fastener assembly 10, a mechanic's fingers may tactilely sense the legs 22 of the indicator plate 20 protruding beyond the washer plate 16.

The first fastener 12 may include a bolt, as illustrated, or a nut, or any other suitable type of fastener. The illustrated first fastener 12 includes a threaded shaft 24 and a torquing feature 26. The chirality (or handedness) of the threads 28 may be right- or left-handed—i.e., following the right hand (or left hand) rule. In FIG. 1, the chirality of the threaded shaft 24 is right-handed. In the illustrated embodiment, the torquing feature 26 includes both a head portion 30 and a flange or washer portion 32 fixed to the head portion. The illustrated first fastener 12 is a hex washer bolt; however, this is merely one example, and other examples may include Torx™ features, socket head features, or any other suitable features. The washer portion 32 may include an axially-facing clamping surface 34 that faces the shaft 24 (i.e., opposite the head portion); and a diameter ($D_{FI-CS}$) of the clamping surface 34 may be suitably sized to couple with the washer plate 16.

The second fastener 14 of FIG. 1 may include a nut, as illustrated, or any other type of suitable fastener. The second fastener 14 may be a separate, individual component, as shown, or may be an integral portion of some other component. The illustrated second fastener 14 may include a body or torquing feature 36 and a passage 38 sized and threaded to receive the shaft 24 of the first fastener 12. The illustrated second fastener 14 is a hex nut; however, this also is merely an example. Other implementations are possible, including implementations omitting the second fastener.

Figure 2A:
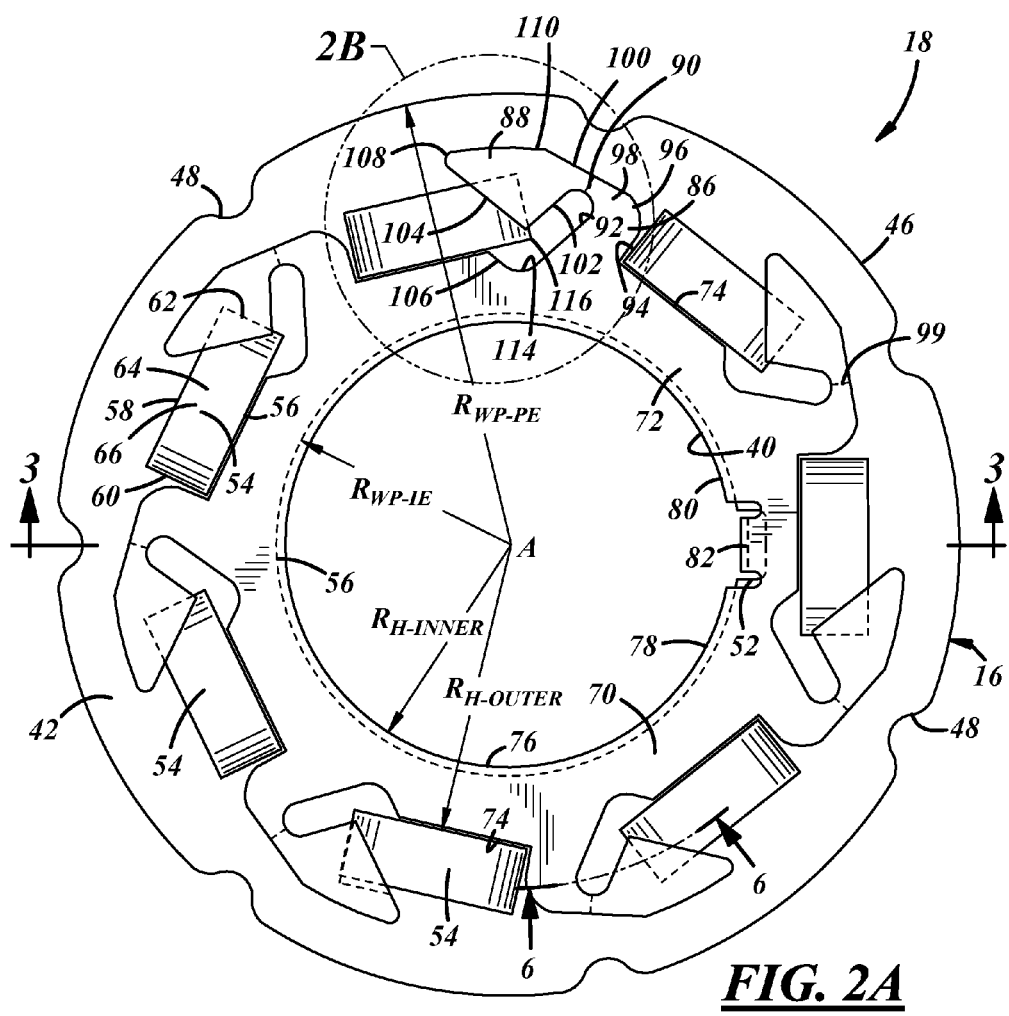
FIG. 2A is a top view of the DTI washer assembly.
Figure 3:
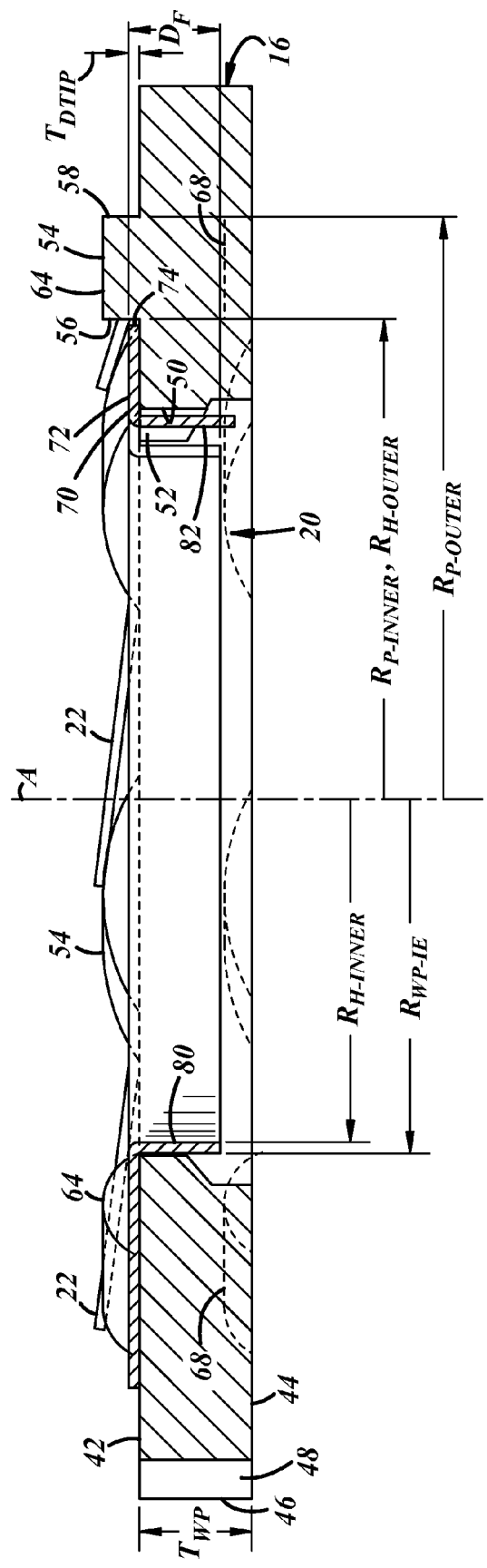
FIG. 3 is a sectional view of the DTI washer assembly of FIG. 2 along section lines 3-3.

The washer plate 16 may be any suitable annulus. As best illustrated in FIGS. 2A and 3, the washer plate 16 may be a disk having an opening 40 and having a first or upper surface 42 spaced from a second or lower or opposing surface 44 (FIG. 3), defining a washer plate thickness ($T_{WP}$) (FIG. 3). In at least some embodiments, the washer plate thickness may be 4.10 millimeters (mm)$\leq T_{WP} \leq$4.29 mm. The washer plate 16 also includes a radial peripheral edge 46 at a radius ($R_{WP-PE}$) having multiple, circumferentially spaced notches 48 and an interior or inner edge 50 at a radius ($R_{WP-IE}$) having a locating relief 52. In the implementation shown, the locating relief 52 is a groove in the inner edge 50 positioned radially outwardly therefrom.

The washer plate 16 may have an annular array of projections or protuberances 54 axially projecting or extending from the first surface 42. The protuberances 54 may be at a common radial spacing from axis A and uniformly distributed therearound. In some embodiments, the quantity of protuberances 54 and quantity of peripheral notches 48 may be the same, and the notches 48 may be spaced such that they are angularly or circumferentially between any two protuberances 54. In at least one embodiment, the protuberances 54 may be similar or identical; therefore, only one will be explained below.

The protuberance 54 may include any feature axially extending from the first surface 42. In the illustrated example (e.g., see FIGS. 2A, 2B, and 3), the protuberances 54 are rectangularly-shaped features having an inwardly-facing edge 56 at a radius ($R_{P-INNER}$), an outwardly-facing edge 58 at a radius ($R_{P-OUTER}$), a first circumferential end 60 and a second circumferential end 62 extending at least partially radially outwardly and defining the length of the circumferential edges 56, 58, and an axially facing compression surface 64. The compression surface 64 may have any suitable shape; however, in at least one implementation, the compression surface 64 is dome-shaped so that a middle region 66 of the protuberance 54 is the farthest from the first surface 42 and the first and second circumferential ends 60, 62 are closer to the first surface 42. Other shapes of the protuberance 54 are possible; e.g., the protuberance 54 may be an arcuate segment, a rounded and/or circular bump, a trapezoidal protrusion, etc.

With reference to FIG. 3, on the second surface 44 of the washer plate 16 there may be an annular array of indentations or cavities or depressions 68 that correspond with the angular position of each of the protuberances 54. The indentations 68 may be any suitable shape to encourage the protuberances 54 to deflect inwardly (e.g., towards the second surface 44) when a predetermined force is applied to the compression surfaces 64.

In one implementation, the washer plate 16 may have seven protuberances 54, seven notches 48, and seven indentations 68; however, other implementations are possible. In addition, the washer plate 16 may be manufactured in accordance any suitable standard, including ASTM-F959, SAE-1050, AASHTO M 292, just to name a few.

Figure 2B:
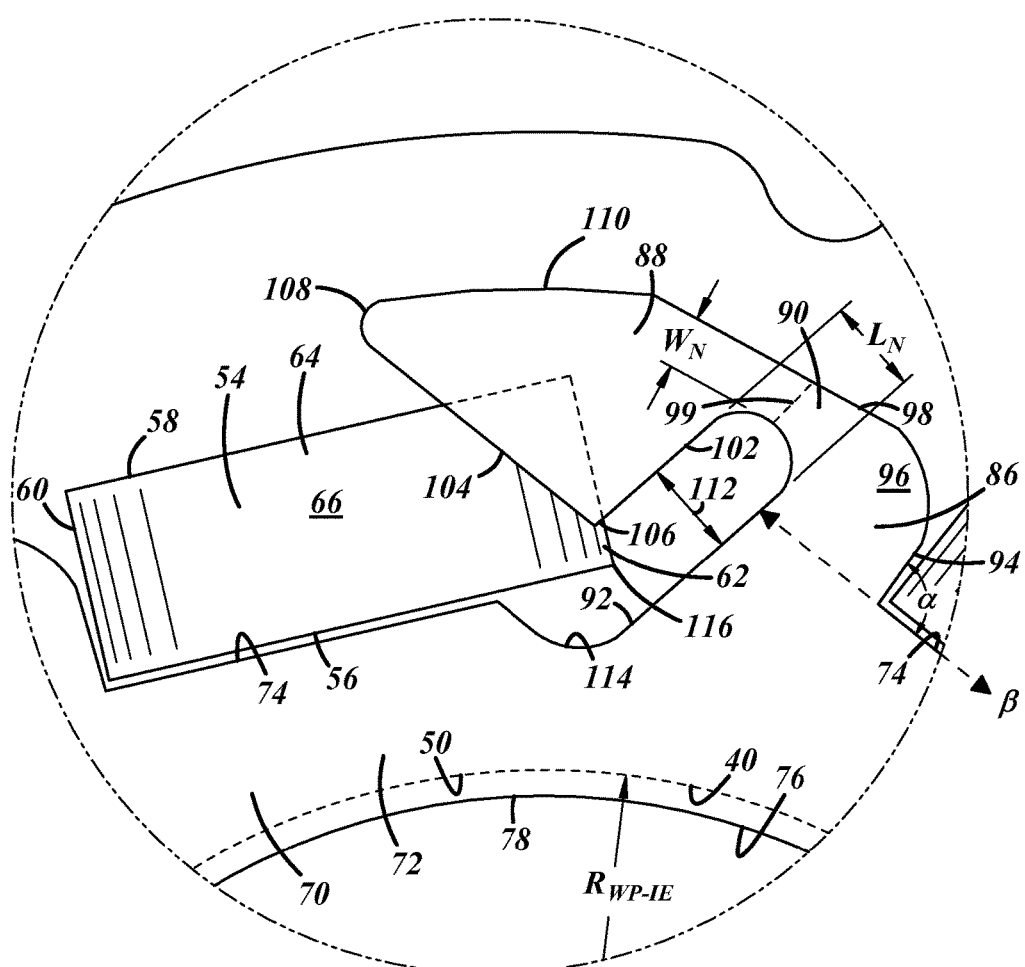
FIG. 2B is an enlarged view of a portion of the top view of FIG. 2A.

In FIGS. 2A, 2B, and 3, the washer plate 16 is shown carrying the indicator plate 20. The indicator plate 20 may include a hub 70 and an annular array of the circumferentially-spaced legs 22 coupled to and extending radially outwardly from the hub 70.

The hub 70 includes an annularly shaped body 72 defined by multiple, circumferentially-spaced outer edges (or outer hub regions) 74 at a radius ($R_{H-OUTER}$), and an inner edge 76 at a radius ($R_{H-INNER}$) defining an opening 78 in the body 72. The radius ($R_{H-OUTER}$) of the outer edges 74 may approximate the radius ($R_{P-INNER}$) of the inwardly-facing protuberance edges 56, thus enabling a press-fit engagement therebetween if desired. Further, the hub's 70 inner edge radius ($R_{H-INNER}$) may approximate the washer plate's 16 inner edge radius ($R_{WP-IE}$), enabling a press-fit engagement therebetween if desired (e.g., $R_{H-INNER}$ may be just slightly less than $R_{WP-IE}$). Both press-fits will be described in greater detail below. An axially-extending flange 80 may extend from the inner edge 76 to an axial depth ($D_F$) that may be less than or equal to the washer plate thickness ($T_{WP}$)—i.e., $D_F \leq T_{WP}$.

The hub flange 80 may include a stake or staking feature 82 (e.g., FIG. 3). The stake 82 may be an axially extending tab or projection that is located radially outwardly of the flange 80. The stake 82 may be sized and shaped to fit within the locating relief 52 of the washer plate 16. In addition, the angular orientation of the stake 82 may be positioned with respect to the legs 22, as also will be described in greater detail below.

One leg 22 may extend from each of the outer edges 74 of the hub 70, and the quantity of the legs 22 and the outer edges 74 may be the same as the quantity of washer plate protuberances 54. In at least one embodiment, each of the legs 22 may be similar or identical; therefore, only one will be explained below.

As best shown in FIG. 2B, the leg 22 may include a knee or first portion 86, a foot or second portion 88, and a flex or ankle or third portion 90 coupling the first and second portions 86, 88 to one another.

More specifically, the first portion 86 may extend from the outer edge 74. The first portion 86 may have a leading edge 92 and a trailing edge 94 extending radially outwardly from the outer edge 74. Both the leading edge 92 and the trailing edge 94 may extend in a chordal direction; e.g., either or both may extend at least partially in a radially outwardly direction. The trailing edge 94 may meet the outer edge 74 at approximately an angle α; and in one implementation angle α may be approximately 90 degrees. As shown in the specific implementation of FIG. 2, the first portion 86 may be wider nearer the outer edge 74 and narrower at a distal end 96 coupling to a first end 98 of the ankle portion 90.

The ankle portion 90 may extend at least partially radially outwardly and also partially in either a clock-wise or counter-clockwise direction. For example, where flange 80 extends axially downwardly (as it does in the top view of FIG. 2A), the ankle portion 90 may extend at least partially counter-clockwise when used with the right-handed first fastener 12 (from FIG. 1). Alternatively, the ankle portion 90 may extend at least partially clockwise when used with a left-handed first fastener. The width ($W_N$) of ankle portion 90 may vary depending upon its thickness and the material of which it is comprised so that it may suitably flex or bend when used in compression with the washer plate 16, as will be described below. In some embodiments, the ankle portion

90 may be narrower than the first portion 86 and/or the second portion 88. And in at least one implementation, the length ($L_N$) of the ankle portion 90 is approximately twice its width ($W_N$). In at least one embodiment, the ankle portion 90 may include a weakening 99 that extends at least partially transversely with respect to the ankle portion 90. The weakening 99 may be any bend, crimp, cut, perforation, thinning, etc. in the ankle portion 90, thereby making the angle portion 90 less rigid and enabling the second portion 88 to more readily radially flex with respect to the first portion 86, as described below.

A second end 100 of the ankle portion 90 is shown coupled to the second portion 88. The second portion 88 may be generally foot-shaped having a first trailing edge 102 that extends from the ankle portion 90 partially radially inwardly to a leading edge 104 of the second portion 88 thereby defining a heel 106. The leading edge 104 extends from the heel 106 to a toe 108, and a second trailing edge 110 extends generally clockwise from the toe 108 to the second end 100 of the ankle portion 90 again. The heel 106 may be located radially outwardly of the hub's outer radius ($R_{H\text{-}OUTER}$), and the toe 108 may be spaced farther radially outwardly of the heel 106.

The first trailing edge 102 of the second portion 88 and the leading edge 92 of the first portion 86 may define a gap or spacing 112 that may extend from the ankle portion 90 to a notch 114 in the hub 70 (i.e., an inwardly-directed depression from the hub's outer edge 74). This gap 112 may sized to receive at least a portion of the protuberance 54; e.g., at least a corner 116 of the protuberance 54 where the second circumferential end 62 meets with the inwardly-facing protuberance edge 56. In addition, in some implementations like that shown in FIG. 2B, the gap 112 may define the length ($L_N$) of the ankle portion 90.

While FIGS. 2A, 2B, and 3 show the indicator plate 20 coupled to the washer plate 16 flexing the legs 22 upwardly from the hub 70, it should be appreciated that the hub body 72 and legs 22 may be generally planar before the indicator plate 20 is coupled to the washer plate 16 and/or when the indicator plate is uncoupled from the washer plate. In addition, the thickness ($T_{DTIP}$) of the indicator plate 20 (i.e., the material thickness of the hub 70, the flange 80, and the legs 22) may be uniform; e.g., in one implementation, the thickness ($T_{DTIP}$) may be 0.30 mm≤$T_{DTIP}$≤0.38 mm. The indicator plate 20 may be made of any suitable material; e.g., in one implementation, the indicator plate 20 may be comprised of any material that is visually distinctive when located proximate the washer plate 16 or provides a contrast when coupled by the fastener 12 to the washer plate 16. The contrast may be by means of color or reflectivity or any other suitable contrasting technique. In at least two specific implementations, indicator plate 20 may be comprised of C-11000 Copper or T-304 Stainless Steel polished to provide a high luster or reflectivity, and the fastener 12 and/or the washer plate 16 may be a dull or lackluster steel. These are merely examples; the fastener 12, the washer plate 16, and/or the indicator plate 20 may be comprised of other materials and in some instances may have coatings.

The indicator plate 20 may be provided by a first manufacturer and the washer plate 16 may be provided by a second manufacturer. Also, a single manufacturer may provide the washer plate 16 and indicator plate 20 pre-assembled as a modular unit—e.g., as the direct tension indicator (DTI) washer assembly 18. In some cases, the first and second manufacturers may be the same entity. A description of the pre-assembly follows.

During pre-assembly, the indicator plate 20 and washer plate 16 may be placed generally co-axial to one another. One or both plates 16, 20 may be rotated to align the stake 82 of the indicator plate 20 with the locating relief 52 of the washer plate. Thus, the stake 82 may orient the legs 22 of the indicator plate 20 with the protuberances 54 of the washer plate 16. Thereafter, the two plates 16, 20 may be adjacent and/or press-fit against one another. The press-fitting may include press-fitting the axially-extending flange 80 of the indicator plate 20 into the inner edge 50 of the washer plate 16, and press-fitting the outer edges 74 of the hub body 72 against the inwardly-facing edges 56 of the protuberances 54 until the hub body 72 is flush with the first surface 42 of the washer plate 16. The alignment of the stake 82 with the locating relief 52 may ensure that the trailing edges 94 (of the first portions 86) of the indicator plate legs 22 may be proximate to or abutting the first circumferential ends 60 of the array of protuberances 54, and the leading edges 104 (of the second portions 88) of the legs 22 may overlay the compression surfaces 64 of the protuberances 54 near each of the second circumferential ends 62. In some instances, the heel 106 on each of the legs 22 may be angularly located between the first circumferential end 60 of one protuberance 54 and the second circumferential end 62 of a circumferentially adjacent or proximate protuberance 54. In addition, the toes 108 of each of the legs 22 may be positioned radially outwardly of the outwardly-facing edges 58 of the protuberances 54.

Figure 6:
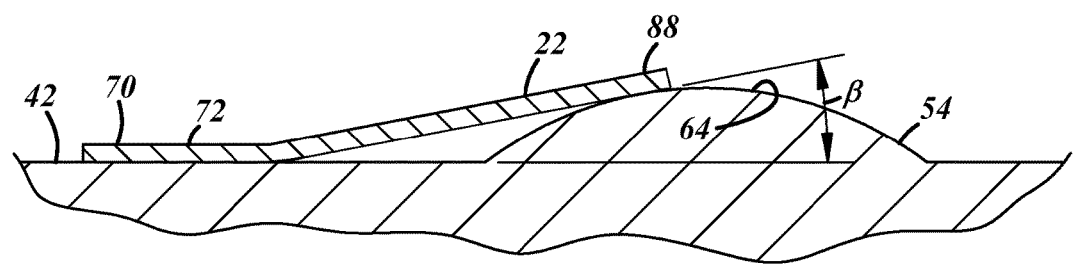
FIG. 6 is a partial sectional view of the DTI washer assembly of FIG. 2 along section lines 6-6.

In the pre-assembled embodiment, the legs 22 may flex upwardly from the first surface 42 of the washer plate 16. FIG. 6 illustrates an example of the flexing or flexure of one of the legs 22. While the hub body 72 may remain flush, the leg 22 may be flexed outwardly from the washer plate's first surface 42 at an angle β as at least part of the leg's second portion 88 overlays the compression surface 64 of the protuberance 54. In at least one implementation, the value of β may be sufficient to present the toe 108 at least one material thickness above the crested middle-region 64 of the protuberance 54, thereby enabling the leg(s) 22 to be forced sufficiently upwardly so that the toe 108 makes contact with the clamping surface 34 of the fastener 12 before the protuberance 54 begins to be compressed.

Figure 7:
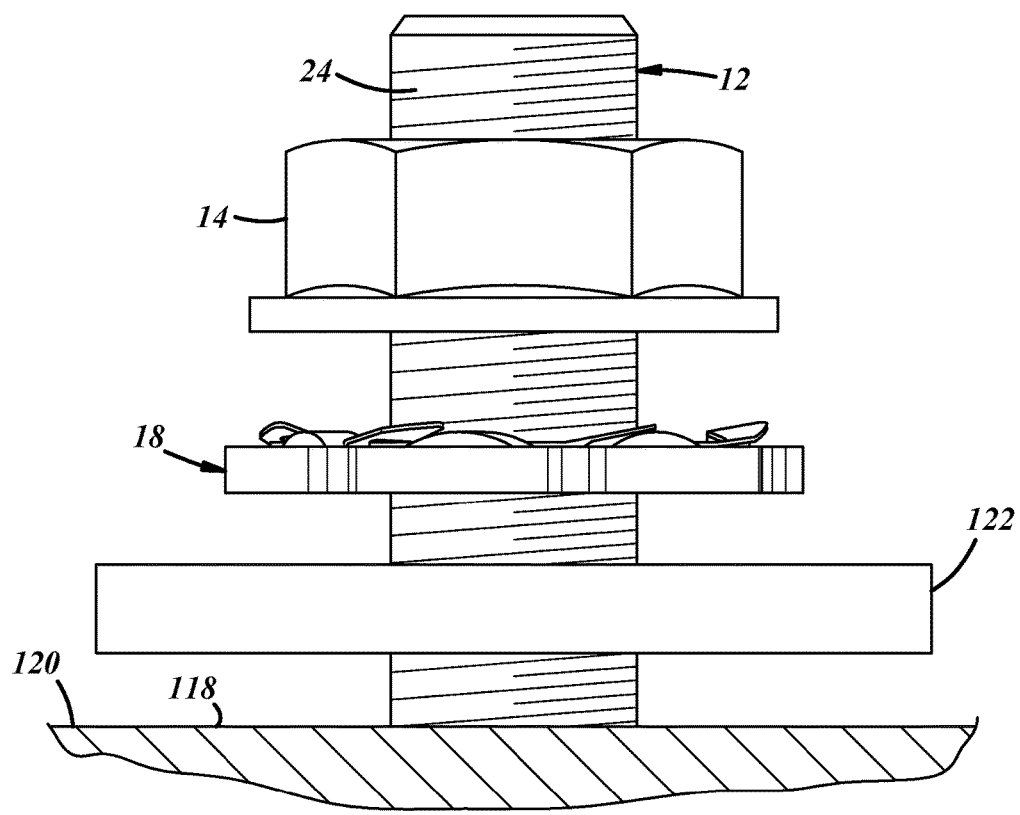
FIG. 7 is a side view of another implementation including the DTI washer assembly and a fastener.

FIG. 4 illustrates the DTI washer assembly 18 and the first fastener 12 where the indicator legs 22 are in a first position ($P_1$). FIG. 5 illustrates the DTI washer assembly 18 and the first fastener 12 where the indicator legs 22 are in a second position ($P_2$) due to tightening the first fastener 12 against the DTI washer assembly 18. In both instances, while the second fastener 14 is not shown (for purposes of clarity), it should be appreciated that the second fastener 14 may be present in some embodiments. In addition, a part or a structure (not shown) having a through-hole may be situated either between the torquing feature 26 of the first fastener 12 and the DTI washer assembly 18 or between the DTI washer assembly 18 and the second fastener 14—i.e., the structure (or structures) to be clamped or secured. And in another implementation, the structure may have a blind hole for receiving the first fastener 12 and the DTI washer assembly 18. And in another implementation (see FIG. 7), only the shaft 24 of a first fastener 12' may protrude from a surface 118 of a first structure 120 (i.e., the first fastener 12' may not have a torquing feature 26), and the second fastener 14 may secure a second structure 122 to the first structure 120 having the DTI washer assembly 18 therebetween. The structures 120, 122 may be any suitable member, body, component, accessory, etc. These are merely examples; other implementations are possible.

In the embodiments of FIGS. 4 and 5, the first fastener 12 and the DTI washer assembly 18 may be received into a blind hole against a structure (not shown). The first fastener 12 may be a hex washer bolt that includes the clamping surface 34 (hidden in FIGS. 4 and 5) having sufficient diameter ($D_{FI-CS}$) to overlay and/or contact the protuberances 54 of the washer plate 16 and the second portions 88 of the indicator plate legs 22. For example, the diameter ($D_{FI-CS}$) may be greater than twice the outer edges' radius ($R_{H-OUTER}$).

In the first position ($P_1$), the clamping surface 34 may make initial contact with the protuberances 54, and in some instances, the second portions 88 of the indicator plate legs 22—e.g., proximate to or at the leading edge 104. From this first position ($P_1$), the torquing feature 26 may be actuated thereby turning or twisting in a clockwise direction the clamping surface 34 against the protuberances 54 and indicator plate legs 22, applying a compression force thereto; e.g., as the shaft 24 of the first fastener 12 may be threaded into the blind hole (e.g., in the structure). As the compression increases between the clamping surface 34 and the protuberances 54, the protuberances 54 may deflect inwardly or toward the second surface 44 (hidden in FIGS. 4 and 5) of the washer plate 16. This may be partially facilitated or enabled by the indentations 68 (hidden in FIGS. 4 and 5) that are correspondingly located with respect to the protuberances 54 on the second surface 44.

As the compression between the clamping surface 34 and the protuberances 54 approaches a predetermined quantity, the clamping surface 34 may begin to apply a clockwise or dextral force against the indicator plate legs 22 as well. The dextral force may overcome the rigidity of the indicator plate legs 22 causing the legs 22 to deform. More specifically, the second portions 88 of the legs 22 are pushed radially outwardly and slightly ahead of the protuberance 54—being so directed by the downward rotation of both the clamping surface 34 and the compression of the protuberance 54. For example, the second portion 88 of each leg 22 may pivot at the ankle portion 90 and displace radially outwardly; in addition, in some instances, the second portion 88 may move axially toward the first surface 42 of the washer plate 16. When the predetermined amount of compression has been applied at the first fastener 12, the indicator plate legs 22 may be in the second position ($P_2$); i.e., the second portions 88 of the legs 22 have extended radially outwardly beyond the peripheral edge 46 of the washer plate 16; e.g., proximate to each of the notches 48.

In the second position ($P_2$), the indicator plate 20 may provide a visual indication that the appropriate compression—e.g., the predetermined quantity—has been applied without the use or inclusion of a special tool (e.g., a torque wrench); i.e., the second portion 88 may be visible extending outwardly from the washer portion 32 of the fastener 12 (or from the nut or fastener 14). This visual indication may be enhanced by the visually distinctive contrast between the legs 22 of the indicator plate 20 and the washer plate 16 (or in other examples, between the legs 22 and a fastener or structure). However, the indicator plate 20 may also provide a tactile indication as well. For example, the operator (e.g., a person applying the torque) may run his or her fingers around the washer plate 16 and tactilely sense the protruding toes 108 of the indicator plate legs 22.

The tactile indication may be particularly useful in low-visibility situations where the first fastener 12, washer plate 16, and/or the indicator plate 20 may be at least partially covered with debris or under low-light situations. For example, in one implementation, the operator may be a soldier in a hostile and muddy environment or area, and the first fastener 12 and the DTI washer assembly 18 may be configured for use on a military tracked vehicle which is stranded due to a broken track. Skilled artisans will appreciate that when track sections are improperly coupled together (e.g., at an inappropriate compression), the repaired track may be redamaged and/or the vehicle may be stranded again. For example, if the fastener 12 and DTI washer assembly 18 are coupled too tightly, adjacent track sections may have too much friction therebetween causing excessive wear or inoperability; and for example, if the fastener 12 and DTI washer assembly 18 are coupled to loosely, the adjacent track sections may vibrate loose, violently disengaging the track from the vehicle again and potentially damaging other track sections or nearby persons. Additionally, if the environment is hostile, the soldier may need to perform these operations in haste—and the presently disclosed device(s) may not require the expenditure of additional or unnecessary time that might otherwise be needed to determine the torque value. This is merely one scenario; other low-visibility situations are possible.

Alternate embodiments also exist. For example, the drawings illustrate seven protuberances 54, seven legs 22, seven notches 48, etc. Other quantities are possible.

In another embodiment, the locating relief 52 may be elsewhere on the washer plate 16. For example, the washer plate 16 may have a keyhole that passes at least partially through the first surface 42 towards the second surface 44. And the indicator plate 20 may have a corresponding feature functioning similar to the stake 82 to angularly orient the indicator plate 20 to the washer plate 16 before the two components are press-fit together.

In another embodiment, the washer plate 16 and indicator plate 20 may not be press-fit together. For example, the two components may be easily separable. Or for example, they may be secured together by means other than press-fitting.

There thus has been disclosed a device that includes a direct tension indicator (DTI) plate having a hub and an array of multiple legs extending radially outwardly from the hub. The DTI plate may be press-fit into a washer plate and provided by a manufacturer as a DTI washer assembly. The DTI washer assembly may be used with an appropriate sized fastener for securing parts, structure, etc. When the DTI washer assembly and first fastener initially are tightened, legs of the DTI plate may be inboard at a first position. When the first fastener is torqued to an appropriate value, the compression between the first fastener and both the washer plate and DTI plate legs may move the legs to a second position. The second position may be visibly and/or tactilely sensed. The device has been disclosed in conjunction with a presently preferred exemplary embodiment, and modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A direct tension indicator (DTI) plate, comprising:
   a hub having an opening, and
   an annular array of circumferentially-spaced legs extending radially outwardly from the hub,
   wherein each leg includes a foot portion, wherein each of the foot portions are oriented at least partially in a circumferential direction.

2. The DTI plate of claim 1, wherein the hub and the array of circumferentially-spaced legs are planar.

3. The DTI plate of claim 1, wherein each of the foot portions are oriented at least partially in a common, circumferential direction.

4. The DTI plate of claim 1, wherein the opening of the hub includes an axially extending flange and a stake, wherein the stake is located radially outwardly of the flange.

5. The DTI plate of claim 1, wherein each leg further comprises a knee portion extending from the hub and an ankle portion that joins the knee and foot portions, wherein the hub is defined by an inner edge at the opening and a plurality of outer edges spaced radially outwardly from the inner edge, wherein the legs extend from the plurality of outer edges, wherein the foot portion of each leg includes a heel and a toe, the heel positioned radially inwardly of the toe, wherein the foot portion is spaced from the knee portion by an opening that extends at least partially radially outwardly therebetween.

6. The DTI plate of claim 5, wherein the knee portion of each leg includes a leading edge and a trailing edge opposite the leading edge, wherein the trailing edge of each leg meets the outer edge at an approximately 90° angle, wherein the foot portion of each leg extends from the ankle portion in the same circumferential direction.

7. The DTI plate of claim 1, wherein the DTI plate is comprised of C-11000 Copper or T-304 Stainless Steel, wherein the thickness (t) of the legs of the hub is 0.30 millimeters (mm)≤t≤0.38 mm.

8. A direct tension indicator (DTI) washer assembly, comprising:
a washer plate having an annular array of protuberances projecting from a surface; and
an indicator plate carried by the washer plate, a portion of the indicator plate being carried on the protuberances.

9. The DTI washer assembly of claim 8, wherein the indicator plate provides a visual contrast with respect to the washer plate.

10. The DTI washer assembly of claim 8, wherein the washer plate includes an annular array of indentations in a second surface opposite the first surface, wherein the locations of the indentations correspond with the locations of the protuberances.

11. The DTI washer assembly of claim 8, wherein an axially extending flange of the indicator plate is press-fit into an opening of the washer plate.

12. The DTI washer assembly of claim 8, wherein each protuberance comprises:
a radially extending first circumferential end;
a radially extending second circumferential end; and
a compression surface located between the first and second circumferential ends, the compression surface being axially spaced from the first surface of the washer plate,
wherein the indicator plate comprises:
a hub, and
an annular array of legs extending radially outwardly from the hub, each leg having a first portion coupled to the hub and a second portion extending from the first portion,
wherein, for each of the legs, the first portion extends at least partially between the first circumferential end of one protuberance and the second circumferential end of a proximate protuberance,
wherein the second portion of each leg overlays part of the compression surface of the proximate protuberance.

13. The DTI washer assembly of claim 12, wherein the washer plate includes an inner edge defining an opening, wherein the inner edge includes a locating relief extending radially outwardly from the inner edge, wherein the hub includes an opening having an axially-extending flange adjacent the inner edge of the washer plate, wherein the flange includes a stake located within the locating relief of the washer plate.

14. The DTI washer assembly of claim 12, wherein a third portion joins the first portion of each leg to the second portion, wherein the third portion is narrower than the first or second portions.

15. The DTI washer assembly of claim 12, wherein each protuberance of the washer plate includes an inwardly-facing edge and an outwardly-facing edge extending between the first and second circumferential ends, wherein the second portion of each leg includes a heel and a toe, wherein the heel of each leg is positioned radially between the inwardly-facing and outwardly-facing edges of each protuberance and the toe of each leg is positioned radially outwardly of the outwardly-facing edge of each protuberance.

16. A direct tension indicator fastener assembly, comprising:
a washer plate having an opening and having an annular array of protuberances projecting from the washer plate;
an indicator plate comprising a hub having an opening and an annular portion that includes an array of legs, wherein at least part of the annular portion is carried by the array of protuberances; and
a fastener having an axially facing surface positioned against the annular portion of the indicator plate to sandwich the annular portion between the axially facing surface and the array of protuberances,
wherein, when the fastener is fastened against the washer plate placing the indicator plate in compression with the washer plate, the array of legs are displaced radially outwardly.

17. The direct tension indicator fastener assembly of claim 16, wherein the array of legs are correspondingly circumferentially spaced apart with respect to the array of protuberances, wherein each leg has a flex region and a foot portion extending from the flex region, wherein each foot portion circumferentially is oriented in a first position, the feet portions being configured to move to a second position radially outwardly of the first position, pivoting at the flex region.

18. The direct tension indicator fastener assembly of claim 17, wherein each leg has a trailing edge abutting a radially extending first end of each protuberance, wherein when the force is applied, the trailing edge is pressed against the first edge encouraging the foot portion to move to the second position.

19. The direct tension indicator fastener assembly of claim 17, wherein each protuberance includes a compression surface axially spaced from the first surface, wherein each leg extends at least partially between one protuberance and a circumferentially adjacent protuberance, wherein a trailing edge of each leg abuts a radially extending first end of the one protuberance and the foot portion of the leg at least partially overlays the compression surface of the circumferentially adjacent protuberance.

20. The direct tension indicator fastener assembly of claim 19, wherein the compression surface of each protuberance is defined by the radially extending first end, a radially extending second end, an inwardly-facing edge, and an outwardly-facing edge extending between the first and second ends, wherein the foot portion of each leg includes a heel and a toe, wherein the heel is positioned proximate to the second end of the circumferentially adjacent protuberance.

\* \* \* \* \*